United States Patent [19]

Fletcher et al.

[11] 3,893,232

[45] July 8, 1975

[54] ELECTRONIC COMPONENT ASSEMBLY APPARATUS

[75] Inventors: Alan T. M. Fletcher, Boulder; Robert J. Godsoe, Jamestown, both of Colo.

[73] Assignee: International Business Machines Corporation, Armonk, N.Y.

[22] Filed: Aug. 16, 1973

[21] Appl. No.: 389,057

[52] U.S. Cl. ............... 29/626; 29/203 B; 29/211 R; 221/95; 227/116

[51] Int. Cl. ....................... H05k 13/04; H05k 13/02

[58] Field of Search .. 29/626, 203 R, 203 B, 203 D, 29/203 DT, 203 P, 206, 208 R, 208 D, 208 E, 208 F, 211 R, 211 D; 221/93–95, 98, 133, 220, 224, 239, 270, 293–294; 72/294, 296, 384, 386, 424, DIG. 1, DIG. 10; 140/1, 71 R, 10 S

[56] References Cited

UNITED STATES PATENTS

| | | | |
|---|---|---|---|
| 2,850,737 | 9/1958 | Walsh | 227/116 |
| 3,008,144 | 11/1961 | Fryklund | 221/95 X |
| 3,254,821 | 6/1966 | Ackerman et al. | 227/119 |
| 3,442,430 | 5/1969 | Ackerman et al. | 227/116 X |
| 3,591,911 | 7/1971 | Goldschmied | 29/203 B |
| 3,618,192 | 11/1971 | Hoffken | 29/203 B |
| 3,710,479 | 1/1973 | Bernardo et al. | 29/211 R X |
| 3,727,284 | 4/1973 | Ragard et al. | 29/203 B |
| 3,777,350 | 12/1973 | Maeda et al. | 29/203 B |

*Primary Examiner*—C. W. Lanham
*Assistant Examiner*—Joseph A. Walkowski
*Attorney, Agent, or Firm*—Gunter A. Hauptman

[57] ABSTRACT

Integrated circuit modules are retained in a number of magazines, there being a different size magazine for each size of module. The magazines are mountable in a horizontal plane at right angles to an insertion assembly which is operable in a vertical plane. The insertion assembly includes an indexable magazine support, an indexable slide having different size interchangeable apertures corresponding to each size of module, an independently movable module guide, a plurality of pin crimping anvils, and drives for imparting relative motion to a module in the module guide and the anvils. An indexable circuit board is positioned between the module guide and anvils. For each circuit board position, a module from one selected magazine is passed through one associated slide aperture and into the module guide. A driver forces the module leads through the circuit board holes and against an associated one of the anvils to spread some of the module leads into module-retaining positions.

14 Claims, 11 Drawing Figures

GUIDE INDEX SELECTOR 523

ELECTRONIC COMPONENT ASSEMBLY APPARATUS

BACKGROUND OF THE INVENTION

1. Field of the Invention

Figure 1:
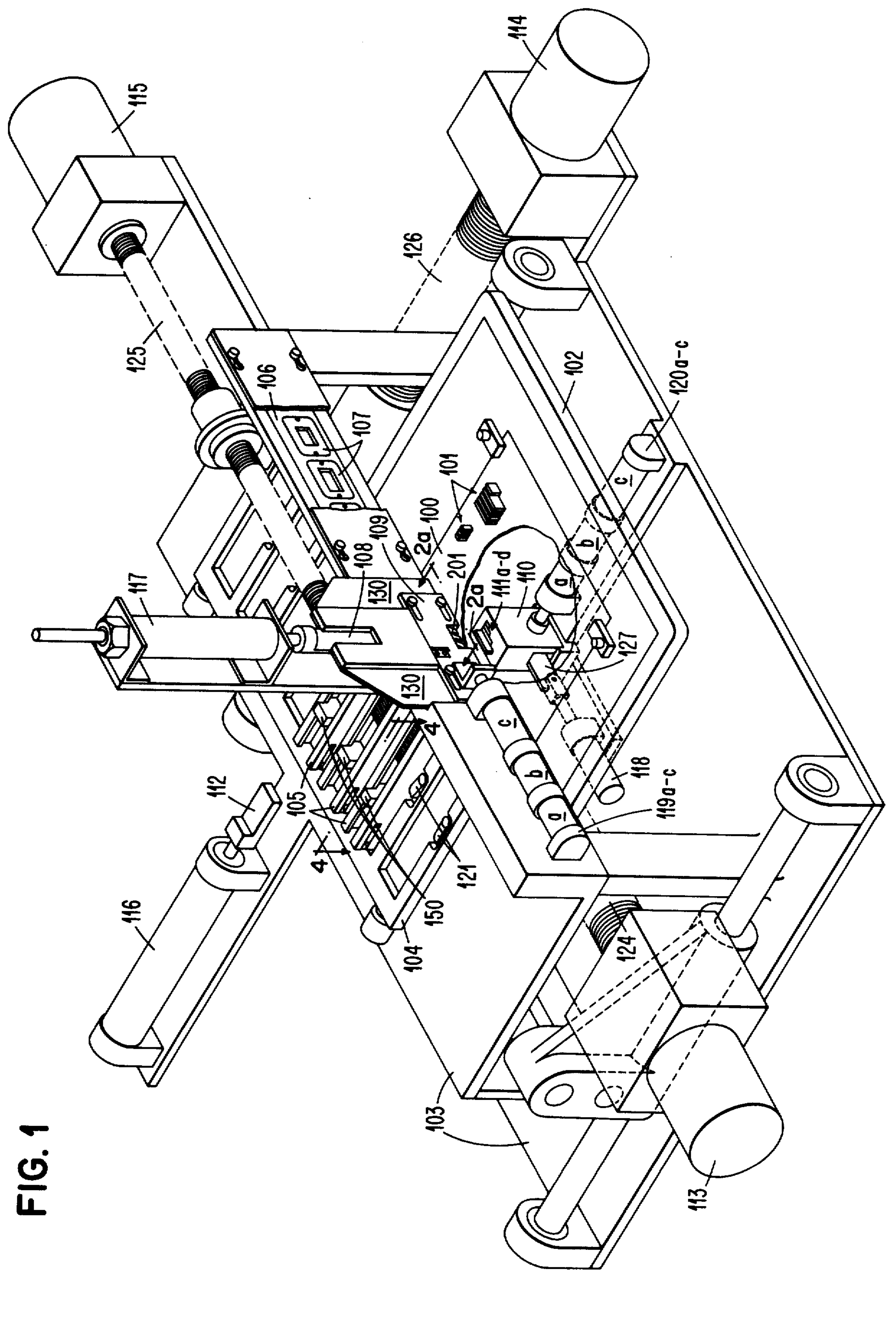

This invention relates to apparatus for inserting components into circuits and particularly to machines for inserting multilead non-radial components of mixed sizes.

2. Description of the Prior Art

The recent wide commercial availability of very small, high density integrated circuit modules has permitted the construction of extremely complex electronic apparatus by simply mounting modules on circuit boards. This requires the insertion of large numbers of differently sized and fragile integrated circuit modules into specific preselected board positions firmly enough to remain in position on the board prior to and during subsequent operations, such as soldering the leads. While single circuit boards can be manually "populated" with modules, great concentration and attention to detail are essential. Thus, hand assembly is very slow and subject to frequent error.

In a copending application, "Electronic Component Assembly Apparatus," of E. T. Bernardo, et al., Ser. No. 119,640, filed Mar. 1, 1971, assigned to the International Business Machines Corporation, now U.S. Pat. No. 3,710,479, there is described an apparatus for automatically inserting a plurality of similarly configured modules into selected circuit board positions. Applicants herein address the problems described in the Bernardo, et al., application with apparatus having features not previously combined in the prior art. Examples of these features are: (1) positive component feed; (2) multilead non-axial lead modules; (3) mixed module size; and (4) module retention following insertion. The prior art includes U.S. Pat. No. 3,008,144 entitled "Component Inserting Machine" of Fryklund, filed Dec. 30, 1957, assigned to the International Business Machines Corporation, which describes a machine for inserting different types of magazine-loaded components, shown illustratively as having axial leads, into a circuit board and then crimping the leads under the board. In Fryklund, the inserted leads are crimped by flattening forming-fingers up against the bottom of the board. Similarly, in an article by S. K. Peredy entitled "Inserting Machine Diode Tester" published in the IBM TECHNICAL DISCLOSURE BULLETIN, September, 1969, page 575, pivoting jaws crimp axial leads and, in an article by P. Closet entitled "Module Crimping Apparatus" published in the IBM TECHNICAL DISCLOSURE BULLETIN, September, 1967, pages 468–469, the leads of multilead non-axial components are crimped. In Lenders U.S. Pat. No. 3,200,481. "Component Inserting Machine," filed Mar. 20, 1961, and assigned to North American Philips Company, Inc., all of a component's axial leads are crimped by pushing the component down through the board against an anvil. Also in the prior art, diverse kinds of component feeding magazines are shown, such as the gravity chutes of the Bernardo et al application and the Fryklund patent, both referenced above, and magazines positively engaging components with adhesive tape, plugs or the like, as shown, for example, in Williams U.S. Pat. No. 2,949,182, "Electrical Components Package," filed Feb. 8, 1956, and assigned to Sprague Electric Company.

The prior art does not suggest apparatus for inserting in selected board positions differently sized integrated circuit modules which have a plurality of non-axial leads, and are positively retained in magazines, and then crimping some but not necessarily all of the module leads. For example, prior art gravity feeding of integrated circuit modules requires that non-axial leads of one module stand on the back of an adjacent module. This not only damages leads, especially when many modules are stacked, but also wastes space in comparison to side stacking. Also, in the prior art, differently sized components require some manual intervention during insertion operations on a single board.

SUMMARY OF THE INVENTION

Applicants have found that modules can be inserted with minimum damage by feeding them between movable and adjustable surfaces to force the leads through holes in an indexable board and crimp the outer leads. The modules are fed from a selected magazine through an aperture in an indexable slide to a relatively movable module guide and anvil. The guide is adjusted to contact some of the module surfaces, and the anvil is selected from a number of different anvil sizes to accommodate the different module sizes. In the described embodiment, the modules are retained (leadsdown) by springs in a horizontal magazine and moved forward under positive external pressure. However, a leads-up position is acceptable with appropriate parts reversals. Each magazine may store a different size module and an entire board may be populated with modules without any manual intervention. Applicants have described portions of this apparatus in an article entitled "Module Insertion Device" published in the IBM TECHNICAL DISCLOSURE BULLETIN, December, 1972, pages 2241–2242.

The foregoing and other objects, features and advantages of the invention will be apparent from the following more particular description of preferred embodiments of the invention, as illustrated in the accompanying drawings.

IN THE DRAWINGS

FIG. 1 is a three-dimensional view of apparatus embodying the invention.

FIG. *2a* is a cross-sectional view taken through plane *2a—2a* of FIG. 1, and FIG. *2b* is a cross-sectional view through plane *2b—2b* of FIG. *2a*.

FIGS. *3a* through *3c* illustrate the operation of the portion of the apparatus shown in FIG. 2.

Figure 4:
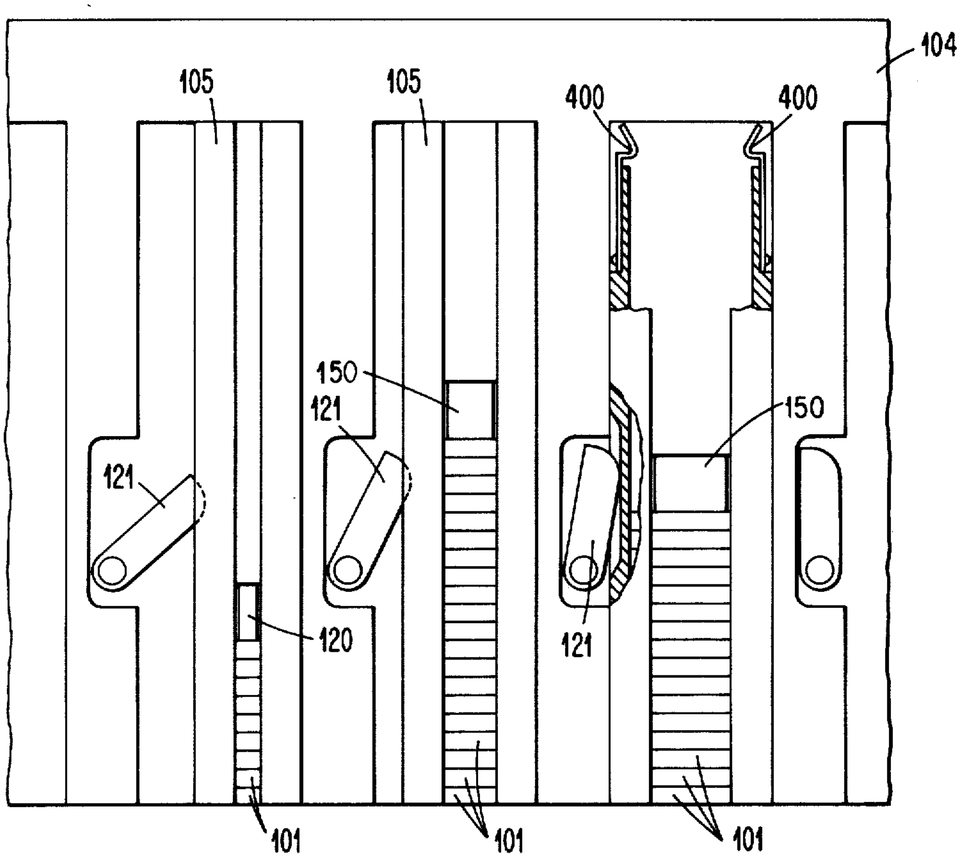

FIG. 4 is a cross-section through plane 4—4 of FIG. 1.

FIG. *5a* is a schematic of controls used to operate the apparatus.

FIG. *5b* is a block diagram illustrating a source of control signals for the circuit of FIG. *5a*.

FIG. *5c* shows the guide index selector of Fig. *5b*.

FIG. *5d* is a waveform diagram illustrating the occurence of signals at the output of the control of FIG. *5b*.

FIG. *5d* is a diagram illustrating the occurence of the control signal sequence employed in the apparatus.

GENERAL DESCRIPTION

Referring now to FIG. 1, there is shown an apparatus embodying the invention. A circuit board 100 is to be populated with modules 101 which are placed into holes (not shown) provided in the circuit board. The circuit board 100 is mounted on an X-Y indexing table 102 which is generally supported by a large base member 103. An indexable magazine support 104 on the base 103 carries a plurality of retainers or magazines 105 for storing additional modules 101. As can be seen in the drawing, the magazines have a variety of widths for accommodating a variety of module sizes. An indexable slide 106 moves with the indexable magazine support 104 to expose at a central point one of a plurality of interchangeable apertures 107. Each of the apertures 107 is associated with a different one of the magazines 105 and has an inner perimeter determined by the outer bounds of the module including its pins. The currently used magazine and its corresponding aperture are positioned in line with the central point, called the "insertion point" herein, defined by the position of a vertically movable insertion driver 108. The insertion driver 108 moves inside a slot of a backing plate 130. An independently movable module guide 109 is moved horizontally to adjust for module size. It will be understood that "horizontal" and "vertically" as used herein are merely illustrative because the invention is not dependent upon gravity. The module guide 109 and backing plate 130 together retain a module received from one of the magazines via one of the apertures 107. As will be explained in greater detail, the guide 109 is adjusted to the module size by moving it toward one side of the module, while another, opposing, side of the module is held in contact with one wall of the backing plate 130 slot.

An anvil support 110 holds a plurality of anvils 111a-d which may be positioned one at a time into alignment with the module guide 109 and the module held therein. Modules are fed from the magazines 105 into the module guide 109 by a loading driver 112 which contacts a backing block 150 in each of the magazines 105. As will be explained with reference to FIG. 4, latches 121 are adjusted to permit magazine support 104 to accommodate different size magazines.

The X-Y indexing table 102 on which the circuit board 100 is mounted is positioned relative to the module guide 109 and anvil support 110 by adjustment of shafts 124 and 126 connected to an X drive motor 113 and a Y drive motor 114. An example of a commercially available assembly combining the table and the drives is the Type NC300 SLO-SYN N/C Positioning Table available from the Superior Electric Co., Bristol, Conn. The indexable slide 106 and indexable magazine support 104 are moved by adjustment of a shaft 125 driven by a magazine indexing drive motor 115. A number of (hydraulically, pneumatically, electrically or otherwise operated) cylinders 116, 117, 118, 119*a–c* *and 120a–c* are provided for activating various linear operations in the apparatus. For example, the loading driver 112 is driven forward by the module loading cylinder 116, the insertion driver 108 is driven downward by the insertion cylinder 117 and an anvil is driven upward when cylinder 118 moves an anvil cam 127 under the selected one of anvils 111*a–d*. Indexing of the movable module guide 109 and the anvil support 110 are performed by respective ones of guide indexing cylinders 119*a–c* and anvil indexing cylinders 120*a–c*. The guide indexing cylinders 119*a–c* include three stepping sections *a*, *b* and *c*, shown as having different lengths. Activation of cylinder section *a* causes a single increment of movement, activation of section *b* causes two increments of movement and activation of section *c* causes three increments of movement. Thus, four module guide 109 positions are obtained: three increments of movement in addition to the deactivated position. Obviously, additional module sizes can be accommodated by adding additional cylinder sections. An alternative design would use series-connected sections, so that cumulative increments of movement occur as a function of the number of cylinders activated. Anvil indexing cylinders 120*a–c* similarly include three sections *a* through *c* which expose one of the anvils when deactivated, a second anvil when the first section is activated, a third anvil when the second section is activated, etc.

In operation, the circuit board 100 is positioned by rotating the X drive motor 113 or the Y drive motor 114, or both, for each different module to be placed on the board. A magazine 105 containing the desired module size is positioned by rotating the magazine indexing drive motor 115 to align the desired magazine and the corresponding aperture 107 with the insertion driver 108 and module guide 109. The module guide 109 may be adjusted by guide indexing cylinders 119*a–c* to move it toward one side of the module before or during the time that a module is fed from a magazine by module loadding cylinder 116. At one of these times, the anvil indexing cylinders 120*a–c* adjust the anvil support 110 to bring into position one of the anvils 111*a–d* corresponding to the size of the module. Subsequently, the anvil camming cylinder 118 brings upward the selected one of the anvils 111*a–d* under the circuit board and the insertion cylinder 117 causes the insertion driver 108 to drive the module down onto the selected anvil.

Figure 2A:
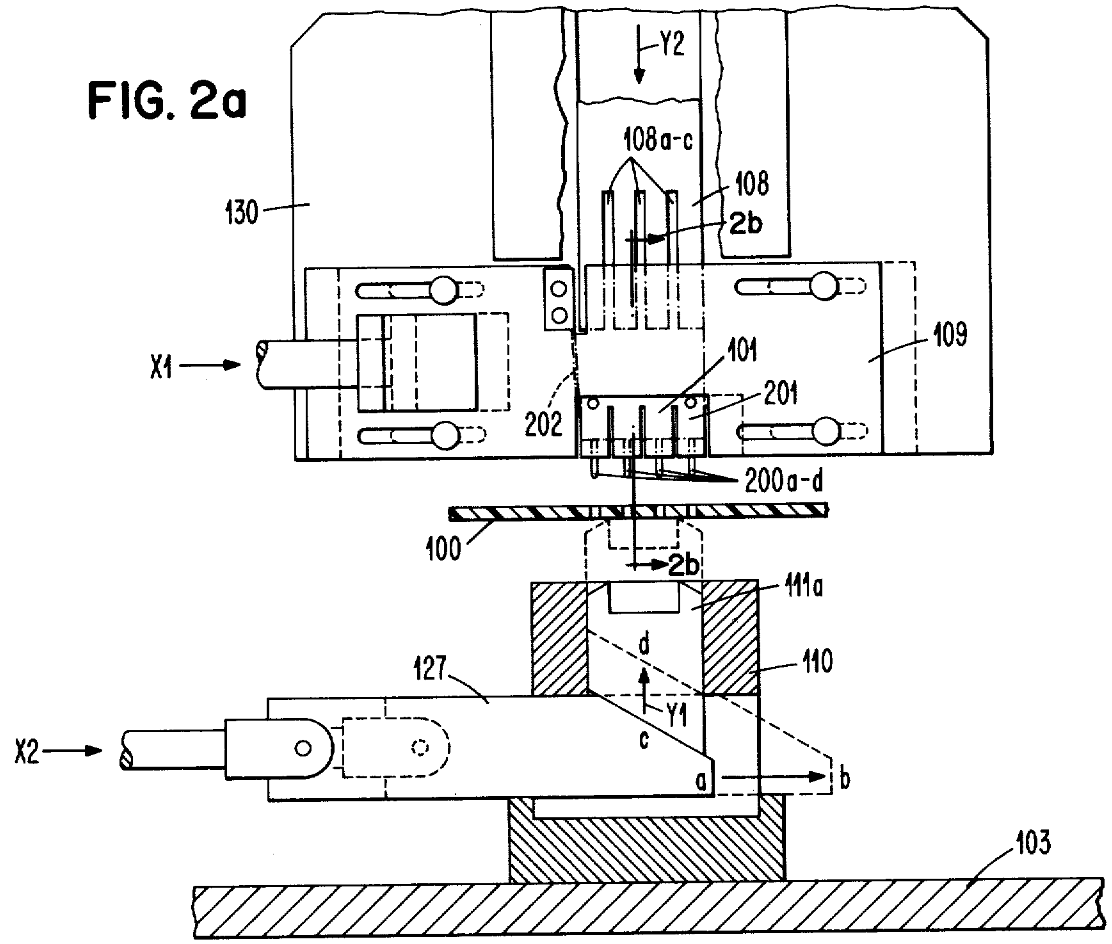
Figure 2B:
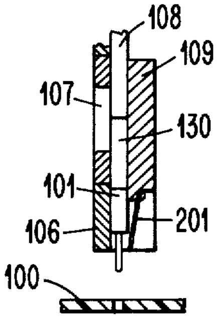

This operation will now be explained in more detail with reference to FIGS. 2*a* and 2*b*. When a selected module 101 is passed through an aperture 107, it is retained on one side by a spring 202 (mounted on the guide 109) and on an opposing side by one wall of the slot in the backing plate 130 in which the insertion driver slides. The front surface of the module abuts the back surface of the guide 109, which includes a flat spring 201 to aid in holding the module just before insertion into board 100. Thus, the component is held in a three-sided guide opening defined by the spring 202 on one side, the backing plate 130 slot wall on another side and the insertion driver 108 on a third. The guide 109 is moved in the direction shown by the horizontal arrow X1 to hold a later-supplied module 101 so that its pins 200*a–d* match holes in the circuit board 100. The spring 202 on the guide 109 will engage the module. Solid lines show the guide 109 before movement and dashed lines after. Movement X2 of the anvil cam 127 from point *a* to point *b* moves anvil 111*a* upward Y1 from point *c* to *d*. This places the anvil 111*a* under the circuit board 100 preparatory to movement of the insertion driver 108 in the direction shown by the vertical arrow Y2. Slots 108*a*, etc., are provided in the driver 108 to accommodate the spring 202 when the driver is moved. The anvils 111*a–d* may be urged to their rest position (point *c*) by, for example, multifingered springs or the like.

Figures 3A, 3B, 3C:
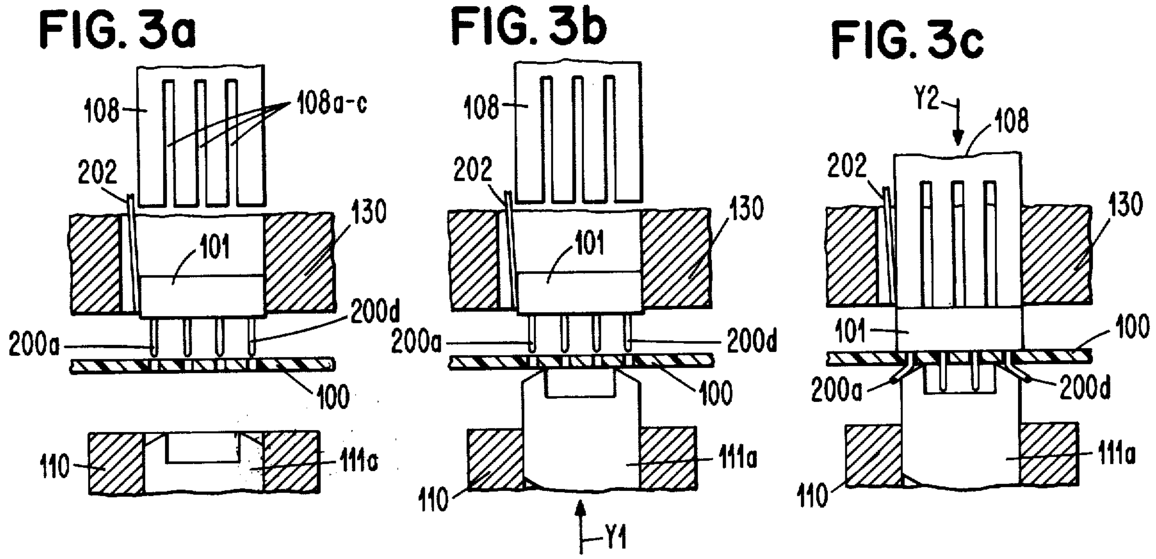

In FIG. 3*a*, the module 101 is positioned over the anvil 111*a*. In FIG. 3*b*, the anvil 111*a* has moved up under the circuit board 100 in direction Y1, and in FIG. 3*c*, the module 101 has been driven downward in direction Y2 to pass its pins through the holes in circuit board 100 to deflect the outermost pins 200*a* and 200*d* outward against lands on top of the anvil 111*a*. The amount of deflection must be sufficient to hold the module in place for subsequent operations while permitting subsequent lead dipping. Normally, the angle of the outermost pins relative to the board 100 will be an acute angle, though in special applications, a different angle may be advantageous.

Referring now to FIG. 4, the magazines are shown in greater detail. Different size modules 101 are stored in the corresponding size magazines 105, retaining springs 400 at both ends keeping the modules from falling out either end during storage and loading. Backing block 150 is preferably the same width as the modules stored in the magazine and may also be restrained by the module retaining springs 400. The magazine latches 121 are positioned to accommodate the various magazine sizes.

Figure 5B:
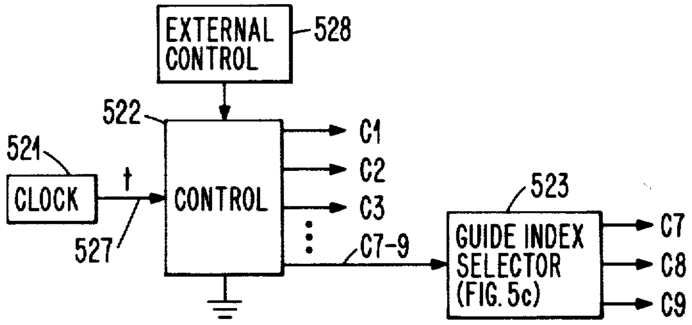
Figure 5C:
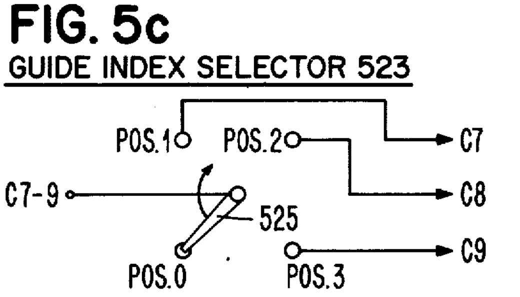
Figure 5A:
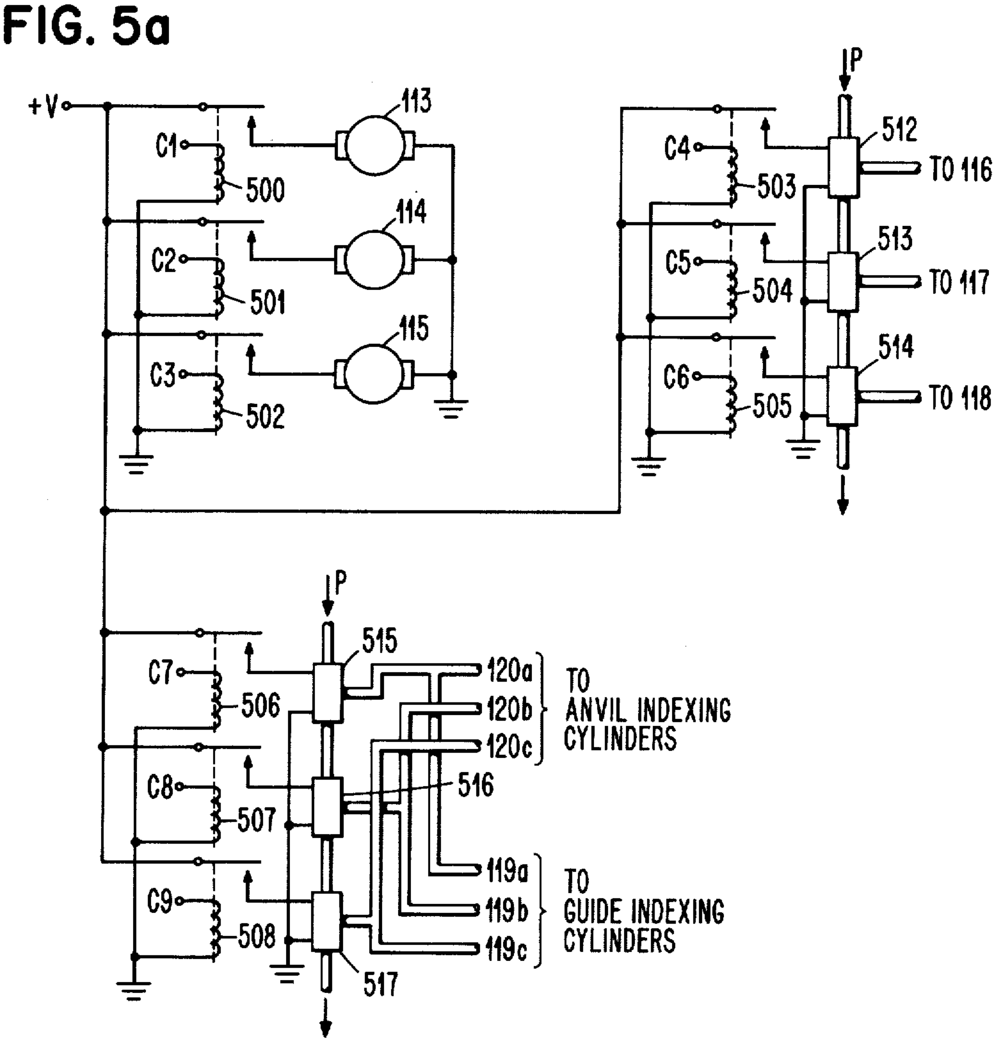

Referring now to FIG. 5*a*, the circuit diagram for operating the motors 113–115 and cylinders 116–120 will be explained. The X drive motor 113, Y drive motor 114, and the magazine indexing drive motor 115 are operated, respectively, by relays 500, 501 and 502 when a corresponding one of illustrative control signals C1, C2 or C3 is provided. For example, in adjusting the position of the circuit board 100 by moving the X-Y board indexing table 102, signals C1 and C2 are provided to close the relays 500 and 501 and independently drive the X drive motor 113 and Y drive motor 114 until the desired position is achieved in accordance with any of a number of well known techniques. For example, the previously referenced Positioning Table uses stepping motors positioned by sequences of pulses from a numeric controller. Alternatively, signals C1, C2 and C3 may be applied for a portion of an available period which is calculated to permit the maximum position change required. Thus, if the X-Y table 102 moves over its entire range during a period T*x*, the control signal C1 (constituting either a series of pulses or a single variable width pulse) occurs during a variable portion of the period T*x*. The magazine indexing drive motor may be of similar design. The module loading cylinder 116, insertion cylinder 117, and anvil camming cylinder 118 are operated by supplying pressure P to the cylinder upon activation of a solenoid valve connected to a pressure source. The solenoids 512, 513 and 514 are operated, respectively, by the relays 503, 504 and 505 under control of corresponding ones of signals C4, C5 and C6. As previously described, the guide indexing cylinders 119*a–c* and anvil indexing cylinders 120*a–c* comprise either stepping or serially connected sections giving four separate positions, including the deactivated rest position. The same set of solenoid valves 515–517 operates both cylinders 119*a–c* and 120*a–c* inasmuch as they may advantageously by synchronized. In each case, the solenoids 515–517 operate the cylinder independently under the control of signals C7, C8 and C9.

The source of the control signals C1 through C9 will now be explained. It will be understood that any of a large number of control techniques are applicable, an illustrative one being outlined hereinafter. Appropriate control may also be achieved with a Type NC1351 Numerical Tape Control available from the Superior Electric Co., Bristol., Conn. The tape may be manually prepared or, if desired, generated by a computer. Alternatively, the computer may directly supply the control signals. In FIG. 5, a clock 521 supplies signals *t* (*t*0, *t*1, etc.) on line 527 for stepping a control 522 which generates signals C1 through C9 as a function of manually or electrically variable external controls 528. The signal C1, for example, occurs at a time when the X drive motor 113 adjustment begins. The exact amount of adjustment is obtained by means of external control 528 which controls the number of sequential stepping pulses or the duration of signal C1. The occurrence of a control signal C7–9 indicates that the guide index cylinders 119*a–c* and anvil index cylinders 120*a–c* are to be operated; the exact amount of operation being determined by index selector 523 which supplies individual cylinder control signals on lines C7, C8 and C9.

Referring to FIG. 5*c*, the index selector 523 is illustratively shown as one manually adjustable single wiper stepping switch. If it is desired to operate the guide indexing cylinders 119*a–c* separately from the anvil indexing cylinders 120*a–c*, a separate similar switch (operated by an additional signal from the control 522) will be necessary. Further, the switch 523 may be remotely operated, either manually or from the referenced Numeric Tape Control, by substituting a rotary stepping switch (for example, an Automatic Electric Type 45). Signals on line C7–9 are supplied to the wiper 525 which successively contacts positions 0, 1, 2 and 3. When the wiper 525 is in position 0, there is no output on lines C7, C8 or C9, and cylinders 119*a–c* remain in the deactivated position. When the wiper is stepped to position 1, an output occurs from line C7. There is an output from line C8 when the wiper 525 is stepped to position 2, and an output occurs from line C9 when the wiper is stepped to position 3. Alternatively, the guide indexing cylinders 119*a–c* may be cumulatively operated (none, one, two and all three in that order) to achieve any one of four positions by using a bridging wiper so that signals C7, C8 and C9 occur in three increasing sets.

Operation

Figure 5D:
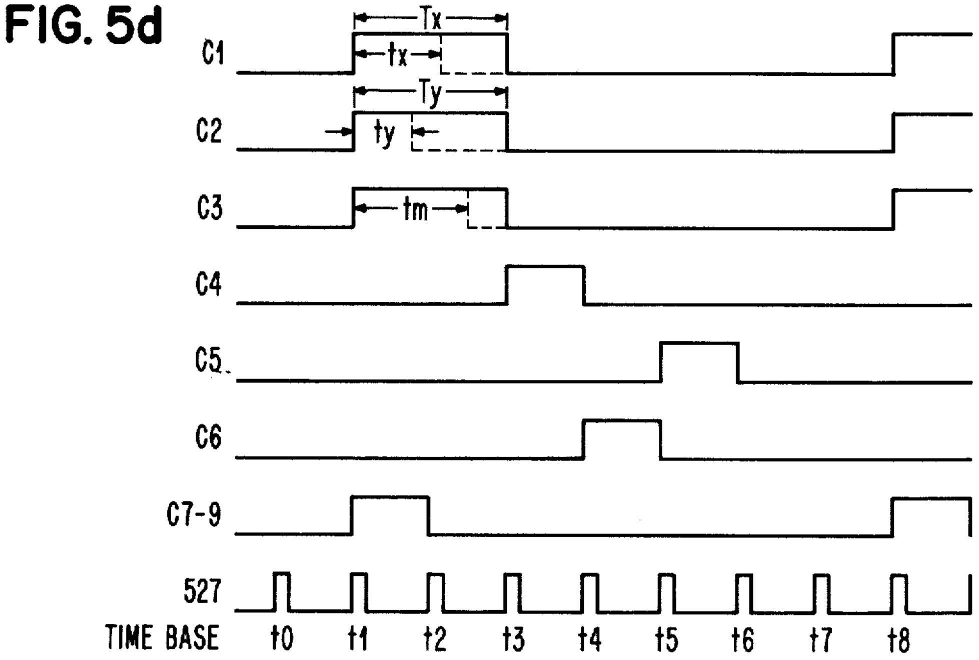

The operation of the invention will now be described with reference to FIG. 5*d*, illustrating the occurrence of the control signals C1 through C9. Initially, the circuit board 100 is placed in the X-Y board indexing table 102. An appropriately sized one of the interchangeable apertures 107 is presumed to be in the indexable slide 106. During times *t*0 to *t*1, one of the anvils 111*a–d* and a module guide 109 position are selected by supplying signal C7–9 and stepping the selector 523 to the appropriate position to generate a control signal from the set C7, C8 and C9. Between times t1 and t3, signals C1 and C2 move the X drive 113 during a boundary period tx and the Y drive 114 during a boundary period ty to place the first set of holes on the circuit board 100 under the insertion driver 108. The total periods of movement possible are T*x* and T*y*. Similarly, during time tm, magazine indexing drive motor 115 places a selected magazine into alignment with the insertion drive 108. At time *t*3, the first module is loaded from its rack by signal C4 which operates the module loading cylinder 116 to force the module through the selected aperture 107 and into the properly positioned module guide 109. At time *t* 4, control signal C6 causes the anvil camming cylinder 118 to drive the anvil cam 127 forward to move a selected anvil in the anvil support 110 upward and place the selected one of the anvils 111*a–d* directly underneath the circuit board. At time *t*5, the anvil position may be sensed (by a switch, not shown) to permit signal C5 to operate the insertion cylinder 117 to drive the module down onto the circuit board, causing the outermost pins to be crimped by the anvil underneath the guide 109. The entire operation except the module size selection steps which are not necessary for modules removed from the same magazine) just described is repeated starting at time $t8$ for the next module which is placed on another circuit board position.

While the invention has been particularly shown and described with reference to preferred embodiments thereof, it will be understood by those skilled in the art that various changes in form and details may be made therein without departing from the spirit and scope of the invention.

What is claimed is:

1. Apparatus for inserting different size modules, each having more than two leads emerging from a first side of the module, into holes in a circuit board, including:

a number of positionable magazines, each magazine retaining a stack of essentially identically dimensioned modules positioned with their leads parallel with each other and also with lines perpendicular through the circuit board holes;

an indexable slide, having a number of interchangeable apertures, each aperture associated with a different magazine and corresponding in size to two dimensions of a module in the associated magazine;

a loading driver, in line with the corresponding magazine and aperture for exerting a positive force on the end of one stack of modules to force a module at the other end of the stack out of the magazine and through the associated aperture in the indexable slide;

a movable guide, adjacent the side of the indexable slide away from the magazines and supported adjacent a top side of the circuit board, positionable to contact at least one side of a module forced out of a magazine;

a plurality of anvils, mounted in an indexable anvil supported adjacent a bottom side of the circuit board, positionable to present a selected anvil, in line with the movable guide, having dimensions corresponding to dimensions of the module forced out of the magazine; and means for relatively moving the module and anvil support toward each other to place module leads into circuit board holes and crimp less than all of the module leads against the board bottom.

2. A device for inserting components into holes in a board, comprising:

an indexable board support table operable to position the board relative to a reference plane perpendicular to the board;

a number of component retainers of different sizes, each size retainer capable of storing a plurality of like-sized components each having more than two electrical leads oriented in the retainer parallel to each other and to the reference plane;

an insertion driver mounted above the board support and in the reference plane;

an indexable anvil support, containing a plurality of anvils, mounted under the board support and the insertion driver, movable to place one selected anvil at a time in the reference plane and in line with the insertion driver;

motive means associated with the retainers for aligning a selected component retainer with the insertion drive and a selected anvil;

loading means connectable to the selected component urging a single component from the selected retainer between the drive and selected anvil; and powering means associated with the insertion driver and anvil support operable when a component is therebetween to force the component leads through the board holes from one side and crimp the two outer leads of the component at an acute angle against the other side of the board.

3. A combination for inserting selected ones of a number of differently dimensioned components into selected ones of a plurality of circuit board locations, each component having more than two leads, depending perpendicularly from a first side of the component along a single line, intended for insertion into a like quantity of holes defining the component location in the board, with the first side of the component adjacent a first surface of the board;

a support for holding the periphery of the board;

a component guide assembly adjacent the first surface of the board defining a three-sided opening for contacting a second and third side of one component at a time with the remaining side of the opening spaced from a fourth side of the component;

a lead bending member adjacent the other surface of the board aligned with the guide for contacting two outer leads of aforesaid one component;

a number of component retainers, each capable of holding a plurality of identically dimensioned components with their alternate fifth and sixth sides juxtaposed and all their leads pointing in one direction; and motive means connected to the board support, component guide, lead bending member and component retainers for aligning all aforesaid elements relative to a selected board location and operable to place one component from a selected retainer between the guide and member and relatively move the component and lead bending member to insert the selected component in the selected board location.

4. Automatic apparatus for removing different width modules from storage magazines and fixedly inserting them in preselected positions on a circuit board, comprising:

a plurality of parallel elongated magazines, each retaining a number of multipin modules, all the modules being oriented with their pins perpendicular to the magazine lengths, and each magazine having a width which is a function of the module width stored therein;

a magazine retaining plate, having a plurality of elongated apertures each capable of receiving one magazine and each including an adjustable mechanism for varying the aperture width to receive different width modules;

a loading driver, operable at one end of one magazine at a time to urge modules on the magazine in a forward direction and thus release one module at a time from the opposite end of the magazine;

an indexing driver, connected to the retaining plate, for moving the magazines on the retaining plate relative to the driver to place one magazine at a time in an operating position with respect to the loading driver;

a movable guide on a first side of the circuit board, for receiving one module at a time from the magazine in the operating position, adjustable to accommodate different width modules by contacting at least one outer module surface with at least one guide inner surface;

a plurality of anvils on a second side of the circuit board, at least one for each module width, mounted on the pin side of the modules received by the guide, selectable one at a time to correspond to the particular width of the module in the guide, all the anvils having one edge in line with each other and another edge aligned with one of the guide inner surfaces when the guide is adjusted to accommodate the module width corresponding to the anvil;

insertion means, on the first side of the circuit board, for driving the module in the guide toward the selected anvil; and an anvil driver, for driving the selected anvil toward aforesaid module.

5. The apparatus of claim 4 wherein the anvil includes two sloped edges for forcing the outer pins of the module in the guide out of their normal alignment.

6. The apparatus of claim 5 wherein the anvil edges slope outward to force the outer pin ends away from each other.

7. Apparatus for inserting different size modules, each having a plurality of leads lying in a plane extending from a first side of the module, into a circuit board, including:

a number of positionable magazines, each magazine retaining a stack of essentially identically dimensioned modules positioned with their leads parallel with each other and also with lines perpendicular through the circuit board;

a movable guide, supported adjacent a first top side of the circuit board, positionable to contact at least one side of a module;

a plurality of anvils, mounted in an indexable anvil support adjacent a second side of the circuit board, positionable to present a selected anvil, in line with the movable guide, having dimensions corresponding to dimensions of a module; and means for relatively moving the module and anvil support toward each other to place a module into the circuit board and crimp less than all of said module leads against a side of the board to remain within aforesaid plane.

8. The apparatus of claim 7 further comprising:

an indexable slide, having a number of interchangeable apertures, each aperture associated with a different magazine and corresponding in size to two dimensions of a module in the associated magazine; and a loading driver, in line with the corresponding magazine and aperture for exerting a positive force on the end of one stack of modules to force a module at the other end of the stack out of the magazine and through the associated aperture in the indexable slide.

9. A device for inserting components into a board, comprising:

an indexable board support table operable to position the board relative to a reference plane perpendicular to the board;

a number of component retainers of different sizes, each size retainer capable of storing a plurality of like-sized components each having more than two electrical leads arranged in a line;

an insertion driver mounted above the board support and in the reference plane;

an indexable anvil support, containing a plurality of anvils, mounted under the board support and the insertion driver, movable to place one selected anvil at a time in the reference plane and in line with the insertion driver; and powering means associated with the insertion driver and anvil support operable when a component is therebetween to force the component leads into the board from one side and crimp along aforesaid line less than all of the leads of the component.

10. The device of claim 9 wherein there are also provided:

motive means associated with the retainers for aligning a selected component retainer with the insertion drive and a selected anvil; and loading means connectable to the selected component urging a single component from the selected retainer between the drive and selected anvil.

11. The device of claim 10 wherein the leads of the component are crimped at an acute angle against a side of the board.

12. A method for inserting different size modules, each having more than two leads emerging from a first side of the module, into holes in a circuit board, including the steps of:

retaining a stack of essentially identically dimensioned modules in magazines so that their leads are parallel with each other and also with lines perpendicular through the circuit board holes;

exerting a positive force on the end of one stack of modules to force a module at the other end of the stack out of the magazine and through an associated aperture;

selecting an anvil having dimensions corresponding to dimensions of the module forced out of the magazine; and relatively moving the forced module and the selected anvil to crimp less than all of the module leads against the board bottom.

13. A method for inserting components into a board, comprising:

positioning the board relative to a reference plane perpendicular to the board;

storing a plurality of like-sized components each having more than two electrical leads oriented in a retainer parallel to each other and to the reference plane;

selecting an anvil and placing it in the reference plane and in line with an insertion driver in the reference plane;

aligning a selected component retainer with the insertion drive and a selected anvil;

forcing the component leads through the board from one side; and crimping less than all of the leads of the component against the other side of the board in a plane defined by the leads.

14. A method for inserting selected ones of a number of differently dimensioned components into selected ones of a plurality of circuit board locations, each component having more than two leads, depending perpendicularly from a first side of the component, intended for insertion into a like quantity of holes defining the component location in the board, with the first side of the component adjacent a first surface of the board;

holding a plurality of identically dimensioned components with alternate sides juxtaposed and leads pointing in one direction;

placing one component from a selected retainer between a guide and the lead bending member;

contacting two outer leads of aforesaid one component with a lead bending member; and relatively moving the guide and member to insert the selected component in the selected board location and crimp said outer leads along a single line.

* * * * *